United States Patent
Feng et al.

(10) Patent No.: US 11,197,174 B1
(45) Date of Patent: Dec. 7, 2021

(54) METHOD FOR CONTROLLING WIRELESS COMMUNICATION, RADIO DEVICE, AND STORAGE DEVICE

(71) Applicants: SHENZHEN JAGUAR WAVE TECHNOLOGY LTD., Shenzhen (CN); SHENZHEN TINNO WIRELESS TECHNOLOGY CO., LTD., Shenzhen (CN); SHENZHEN TINNO MOBILE TECHNOLOGY CO., LTD., Shenzhen (CN)

(72) Inventors: Ethan Feng, Shenzhen (CN); Chihkai Liu, Shenzhen (CN)

(73) Assignees: SHENZHEN JAGUAR WAVE TECHNOLOGY LTD., Shenzhen (CN); SHENZHEN TINNO WIRELESS TECHNOLOGY CO., LTD., Shenzhen (CN); SHENZHEN TINNO MOBILE TECHNOLOGY CO., LTD., Shenzhen (CN)

(*) Notice: Subject to any disclaimer, the term of this patent is extended or adjusted under 35 U.S.C. 154(b) by 2 days.

(21) Appl. No.: 16/930,282

(22) Filed: Jul. 15, 2020

(51) Int. Cl.
*H04B 1/38* (2015.01)
*H04W 16/28* (2009.01)
(Continued)

(52) U.S. Cl.
CPC ........... *H04W 16/28* (2013.01); *H04W 24/08* (2013.01); *H04W 28/18* (2013.01); *H04W 40/06* (2013.01); *H04W 84/18* (2013.01); *H04W 88/08* (2013.01)

(58) Field of Classification Search
None
See application file for complete search history.

(56) References Cited

U.S. PATENT DOCUMENTS

| 4,755,825 A * | 7/1988 | Crochet | H01Q 3/20 343/757 |
| 2013/0328723 A1* | 12/2013 | Rappaport | H01Q 1/245 342/372 |

(Continued)

FOREIGN PATENT DOCUMENTS

| CN | 102118850 A | 7/2011 |
| CN | 104467911 A | 3/2015 |

(Continued)

OTHER PUBLICATIONS

First Office Action from China patent office in a counterpart Chinese patent Application 201810024933.2, dated Oct. 9, 2021 (16 pages).

*Primary Examiner* — Gary Lafontant

(57) ABSTRACT

The present disclosure relates to the field of wireless communication technology and discloses a method for controlling a wireless communication, a radio device, and a device having a storage function. The method includes establishing a communication connection between a radio node end and a site end; obtaining an antenna field shape information between the radio node end and the site end; obtaining an image information of the site end based on the antenna field shape information between the radio node end and the site end, to monitor a motion state of the site end; determining whether the site end is displaced, and adjusting the antenna field shape between the radio node end and the site end when the site end is determined to be displaced.

20 Claims, 6 Drawing Sheets

(51) Int. Cl.
*H04W 84/18* (2009.01)
*H04W 28/18* (2009.01)
*H04W 40/06* (2009.01)
*H04W 24/08* (2009.01)
*H04W 88/08* (2009.01)

(56) References Cited

U.S. PATENT DOCUMENTS

2015/0269818 A1* 9/2015 Jain .................... G08B 13/2488
340/572.1
2019/0140340 A1* 5/2019 Ramasamy ............ H01Q 25/00

FOREIGN PATENT DOCUMENTS

| | | | |
|---|---|---|---|
| CN | 105813095 A | | 7/2016 |
| CN | 106602219 A | | 4/2017 |
| CN | 106658567 A | | 5/2017 |
| CN | 110022566 A | * | 7/2019 |
| CN | 112417929 A | * | 2/2021 |
| KR | 20000061771 A | | 10/2000 |
| WO | WO02058186 A2 | | 7/2002 |
| WO | WO2016028081 A1 | | 2/2016 |

* cited by examiner

METHOD FOR CONTROLLING WIRELESS COMMUNICATION, RADIO DEVICE, AND STORAGE DEVICE

TECHNICAL FIELD

The present disclosure relates to the field of wireless communication technology, and in particular to a method for controlling a wireless communication, a radio device, and a device having a storage function.

BACKGROUND

An antenna signal is needed for transmitting information, when a radio device is wirelessly communicated with a signal base station or another radio device. A characteristic of the antenna, such as a field shape, may affect a transmission characteristic between a transmitter and a receiver. Conventional antenna designs propagate signal by a wide range of the antenna field shape. However, in a complex external environment, a signal interference among different radio devices may be increased, such that the strength of the transmitted signal is reduced, and the content of the signal is missing. Therefore, the radio device is required to constantly search for the optimal antenna field shape to ensure the stability of the transmitted signal. However, the process of searching for the optimal antenna field shape is a complex computational process with high energy consumption, which does not allow a real-time adjustment of the antenna field shape, does not adjust the antenna field shape according to the actual condition of the radio device, and thus affects propagating the wireless signal.

SUMMARY OF THE DISCLOSURE

A technical scheme according to the present disclosure is providing a method for controlling a wireless communication, including: establishing a communication connection between a radio node end and a site end, and obtaining an antenna field shape information between the radio node end and the site end; obtaining an image information of the site end based on the antenna field shape information between the radio node end and the site end to monitor a motion state of the site end; and determining whether the site end is displaced, and adjusting the antenna field shape between the radio node end and the site end in response to the site end being displaced.

Another technical scheme according to the present disclosure is providing a device having a storage function, capable of storing a program data, wherein the program data is executed to achieve method for controlling a wireless communication, including: establishing a communication connection between a radio node end and a site end, and obtaining an antenna field shape information between the radio node end and the site end; obtaining an image information of the site end based on the antenna field shape information between the radio node end and the site end to monitor a motion state of the site end; and determining whether the site end is displaced, and adjusting the antenna field shape between the radio node end and the site end in response to the site end being displaced.

Another technical scheme according to the present disclosure is providing a radio device, including a processor, a camera module, a device having a storage function, and a radio frequency module. The processor is coupled to the camera module. Operations performed by the processor include: controlling a communication connection between a radio node end and a site end to be established, obtaining the antenna field shape information between the radio node end and the site end; controlling the camera module to obtain an image information of the site end based on the antenna field shape information between the radio node end and the site end, to monitor a motion state of the site end; determining whether the site end is displaced, and adjusting the antenna field shape between the radio node end and the site end in response to the site end being displaced.

BRIEF DESCRIPTION OF THE DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION

Referring to the accompanying drawings according to the embodiments of the present disclosure, technical schemes of the embodiments will be described clearly and completely.

According to a method for controlling a wireless communication provided by the present disclosure, a video information at a site end is monitored, such that an antenna field shape between a radio node end and the site end may be adjusted in real time. The method may be applicable in an environment where radio signals are exchanged between different radio devices. A camera device on the radio device is configured to real-time monitor a displacement of the radio device, adjusting the antenna field shape in real time. For example, radio signals are exchanged between mobile terminals through mobile terminal hotspots. The method may be also used in another environment where radio signals are exchanged between a base station and a radio device. A camera device on the base station is configured to real-time monitor a displacement of the radio device, adjusting the antenna field shape in real time. For example, a wireless communication connection such as WI-FI is established between a router and a mobile terminal, with a camera device on the router configured to real-time monitor the radio device for exchanging the radio signal; The method may be also applicable in another environment where base stations are real-time monitored by a camera device, adjusting the antenna field shape in real time. The applicable environments for the method for controlling the wireless communication provided by the present disclosure include, but are not limited to, the above. Any communication method required to adjust the antenna field shape belongs to the applicable environments for the method for controlling the wireless communication provided by the present disclosure, which are not limited herein.

Figure 1:
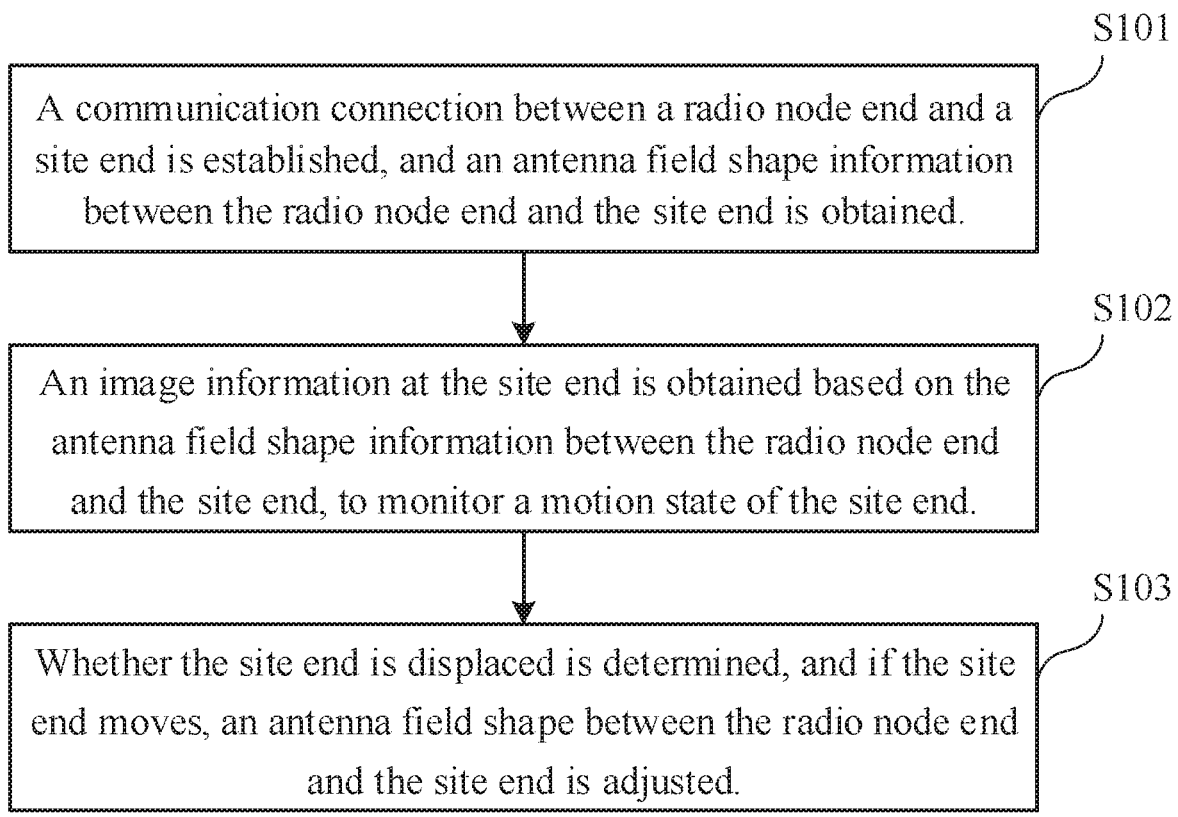
FIG. 1 is a flow chart of a method for controlling a wireless communication according to a first embodiment of the present disclosure.

Referring to FIG. 1, FIG. 1 is a flow chart of a method for controlling a wireless communication according to a first embodiment of the present disclosure.

At block S101: A communication connection between a radio node end and a site end is established, and an antenna field shape information between the radio node end and the site end is obtained.

In the embodiment, the radio node end is an access node to a core network or a local area network. The site end is required to be communication connected with the radio node end, such that the site end may access the core network or the local area network via the radio node end. After the communication connection between the radio node end and the site end is established, radio signals are exchanged between the radio node end and the site end by propagating antenna signals. Therefore, the antenna field shape information between the radio node end and the site end may affect the radio signal transmission performance therebetween. The antenna field shape information between the radio node end and the site end is obtained, such that the antenna field shape information between the radio node end and the site end may be adjusted accordingly, ensuring an efficient transmission of radio signals between the radio node end and the site end.

At block S102: An image information at the site end is obtained based on the antenna field shape information between the radio node end and the site end, to monitor a motion state of the site end.

In the embodiment, after the antenna field shape information between the radio node end and the site end is obtained, a relative position of the site end and the radio node end may be calculated, based on the antenna field shape information therebetween. The position of the site end is calculated according to an image screen captured by the radio node. The image screen of the position is configured as the image information of the site end. The image information of the site end is monitored to monitor the motion state of the site end. If a motion occurs in the image information of the site end, then the site end is displaced, and vice versa.

At block S103: Whether the site end is displaced is determined, and if the site end is displaced, an antenna field shape between the radio node end and the site end is adjusted.

In the embodiment, the image information of the site end is monitored to monitor the motion state of the site end. If a displacement occurs in the image information of the site end, then the site end is displaced. The image information corresponding to the site end is thus displaced in the image screen captured by the radio node end. That the site end is displaced means that the position of the site end relative to the radio node end changes. The antenna field shape of the radio signals radiated from the radio node end to the site end may not cover the site end, such that a transmission efficiency is reduced. Therefore, the antenna field shape of the radio signal radiated from the radio node end to the site end is required to be adjusted, and an antenna field shape is selected to adapt to the displaced site end. In such a way, the transmission performance between the radio node end and the site end is ensured, and the transmission of the radio signals between the two may not be affected.

According to the description above, a communication connection is established between the radio node end and the site end to obtain the antenna field shape information. Based on the obtained antenna field shape information, the relative position of the site end and the radio node end is determined. The image screen of the position captured by the radio node end is thus identified as the image information of the site end. The image information of the site end is monitored to monitor the motion state of the site end. If the site end is displaced, the antenna field shape between the radio node end and the site end is adjusted. The motion state of the site end is monitored in real time, to adjust the antenna field shape between the radio node end and the site end in real time.

Figure 2:
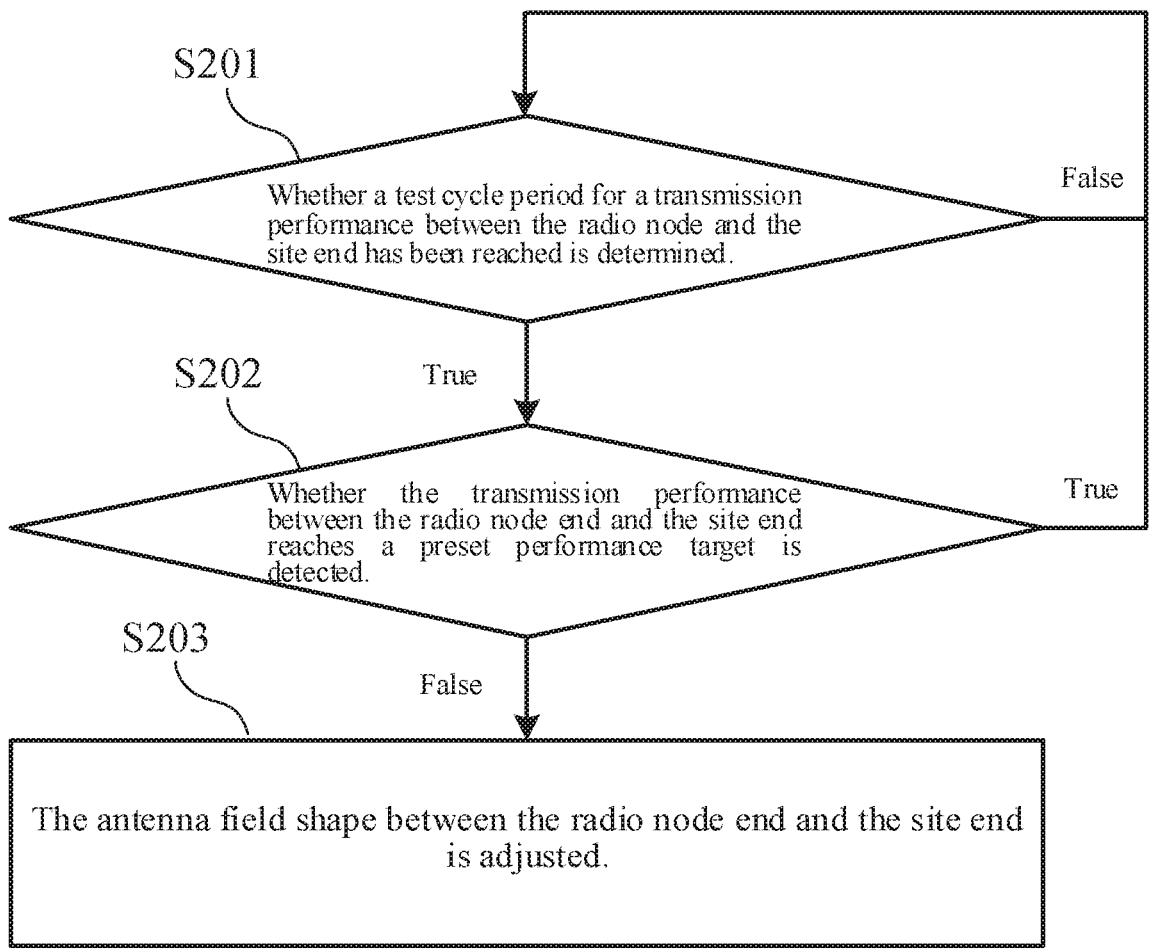
FIG. 2 is a flow chart of a method for controlling a wireless communication according to a second embodiment of the present disclosure.

Referring to FIG. 2, FIG. 2 is a flow chart of a method for controlling a wireless communication according to a second embodiment of the present disclosure.

At block S201: Whether a test cycle period for a transmission performance between the radio node and the site end has been reached is determined.

In the embodiment, if the test cycle period for the transmission performance between the radio node end and the site end has been reached, block S202 is performed. If the test cycle period has been not reached, block S201 is continued.

In the embodiment, the transmission performance between the radio node end and the site end is periodically detected, with a second preset duration as the test cycle period. A calculation and a determination of the optimal antenna field shape between the radio node end and the site end is a computationally intensive procedure, and may be implemented by a central processing unit (CPU). The higher a frequency of the calculation and determination process is, the more closely the adjustment of the antenna field shape between the radio node end and the site end is adapted to the actual motion state of the site end, and thus the better the transmission performance between the radio node end and the site end is ensured. However, a CPU computational load is also heavier, resulting in an excessive power consumption. Therefore, in the embodiment, a periodic detection of the transmission performance between the radio node end and the site end is performed to reduce the CPU computational load, and reduce a power consumption of the radio node end.

At block S202: Whether the transmission performance between the radio node end and the site end reaches a preset performance target is detected.

In the embodiment, if the transmission performance between the radio node end and the site end does not reach the preset performance target, block S203 is performed. If the transmission performance between the radio node end and the site end reaches the preset performance target, block S201 is continued.

In the embodiment, the transmission performance between the radio node end and the site end is periodically detected. The preset performance target is a minimum transmission performance with which the signal transmission between the radio node end and the site end is not affected. When the transmission performance between the radio node end and the site end is detected not to reach the preset performance target, the transmission performance therebetween does not meet the normal signal transmission therebetween, which means that the antenna field shape between the radio node end and the site end is required to be adjusted. In such a way, the signal transmission between the radio node end and the site end is restored to be normal.

When the transmission performance between the radio node end and the site end is detected to reach the preset performance target, the transmission performance therebetween meets the signal transmission therebetween, which means that the antenna field shape between the radio node end and the site end is not required to be adjusted.

At block S203: The antenna field shape between the radio node end and the site end is adjusted.

In the embodiment, the transmission performance between the radio node end and the site end does not reach the preset performance target, that is, the transmission performance therebetween does not meet the requirement of the normal signal transmission therebetween. The antenna field shape between the radio node end and the site end is thus adjusted and calculated to determine an appropriate antenna field shape adapted to the site end. The appropriate antenna field shape is then applied, such that the site end is better covered by the antenna field shape of the radio signal radiated from the radio node end, and the signal transmission between the radio node end and the site end is restored to be normal.

According to the embodiment, the transmission performance between the radio node end and the site end is periodically detected, to reduce the CPU computational load and the power consumption of the radio node end. When the clock-time is not in the test cycle period, the transmission performance between the radio node end and the site end is not detected by the radio node end. If the transmission performance between the radio node end and the site end during that time does not meet the requirement, the antenna field shape between the radio node end and the site end is not adjusted. Therefore, the technical scheme described in the above embodiment does not achieve a real-time adjustment of the antenna field shape between the radio node end and the site end.

Figure 3:
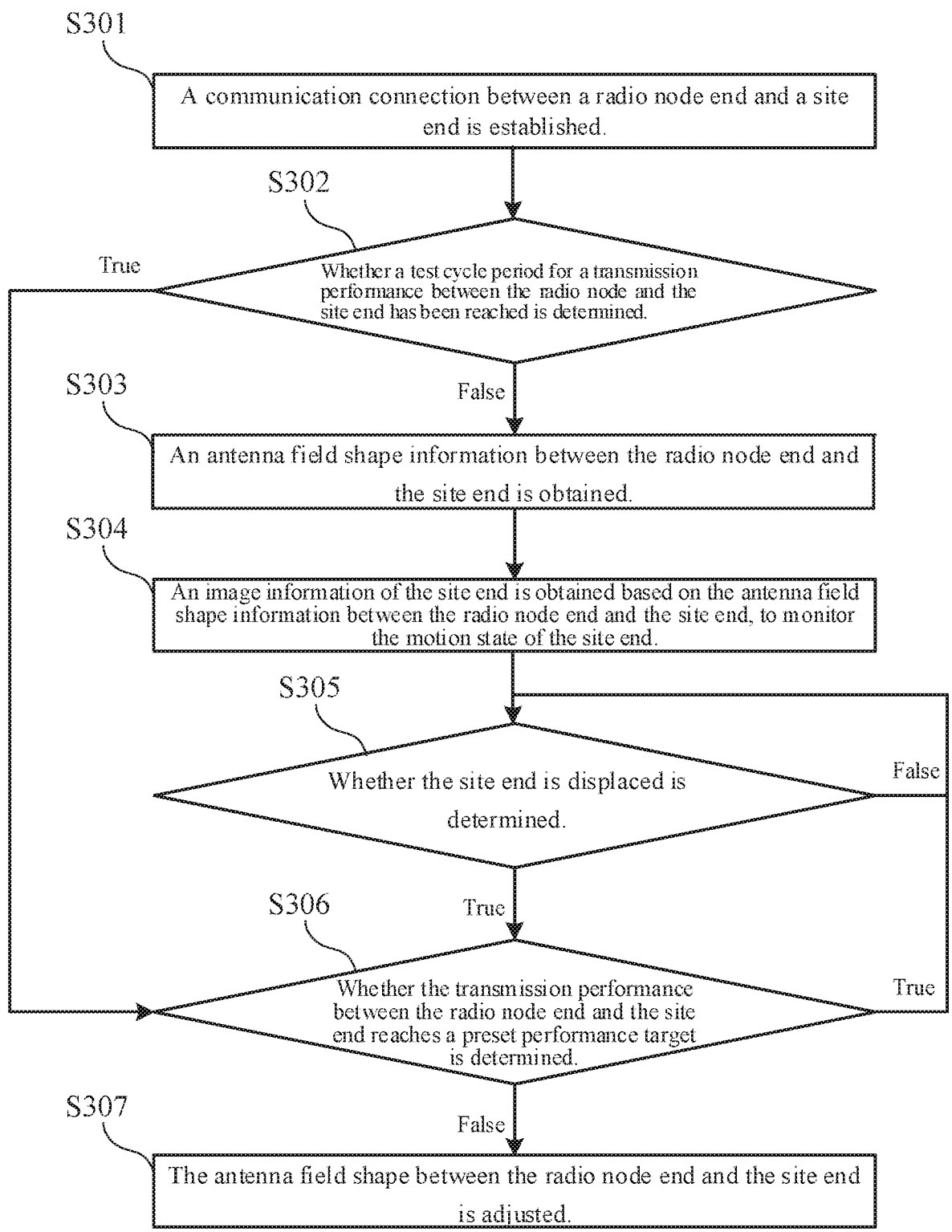
FIG. 3 is a flow chart of a method for controlling a wireless communication according to a third embodiment of the present disclosure.

Referring to FIG. 3, FIG. 3 is a flow chart of a method for controlling a wireless communication according to a third embodiment of the present disclosure.

At block S301: A communication connection between a radio node end and a site end is established.

In the embodiment, the radio node end is an access node to a core network or a local area network. The site end is required to be communication connected with the radio node end, such that the site end may access the core network or the local area network via the radio node end. After the communication connection between the radio node end and the site end is established, radio signals are exchanged between the radio node end and the site end by radiating antenna signals. The radio node end and the site end may be a base station, a router or a mobile terminal. The communication connection between the site end and the radio node end provides a signal transmission channel therebetween. The site end accesses the core network or the local area network associated with the radio node end through the communication connection via the radio node end as a medium. For example, the site end accesses the Internet via the radio node end, etc.

Alternatively, in the establishing the communication connection between the radio node end and the site end, since the radio node end and the site end does not realize each other's relative positions until the communication connection is established, the radio node end is required to propagate the radio signal with an omnidirectional antenna field shape. The site end is also required to propagate the radio signal with the omnidirectional antenna field shape. When the antenna field shape of the radio signals propagated from the site end and the antenna field shape of the radio signals propagated from the radio node end are in contact with each other, the radio node end and the site end may sense each other and establish the communication connection. However, since the antenna field shape of the radio signals propagated from the site end and the antenna field shape of the radio signals propagated from the radio node end are omnidirectional, the radio node end and the site end still cannot obtain each other's specific position. Therefore, after the communication connection between the radio node end and the site end is established, the radio node end calculates a directional antenna field shape adapted to the site end, while ensuring that the signal transmission performance between the radio node end and the site end meets the requirements. In such a way, the position of the site end relative to the radio node end may be obtained according to a pointing direction of the directional antenna field shape, while the communication connection between the radio node end and the site end is maintained.

Figure 4:
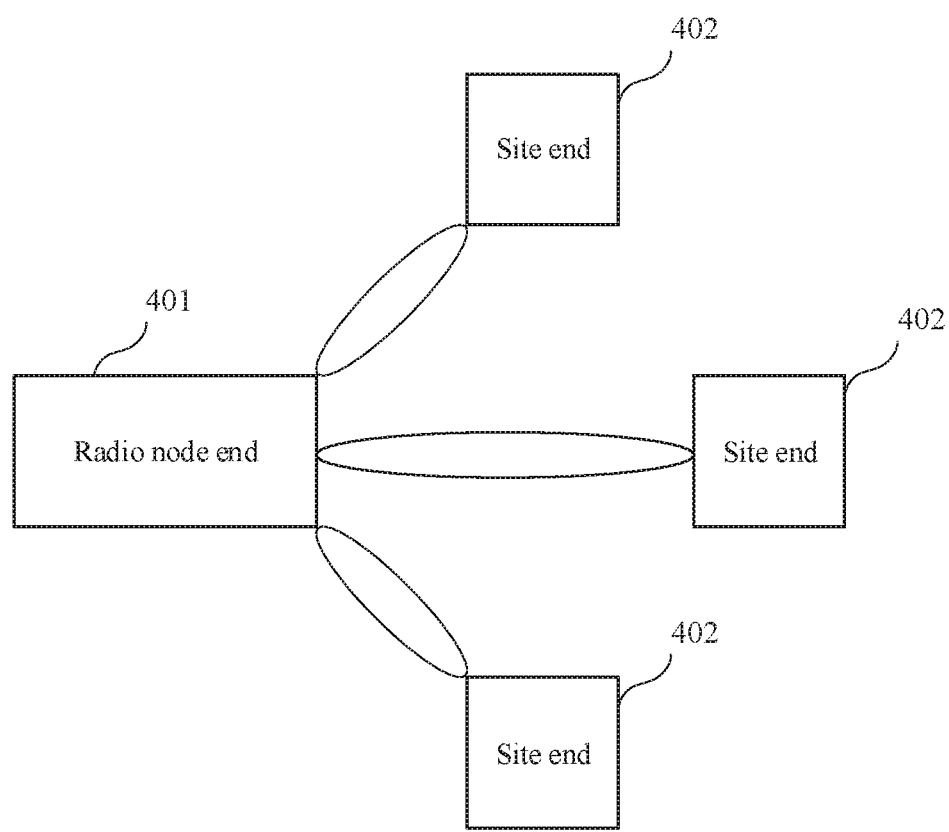
FIG. 4 is a structural schematic view of a combined antenna field shape according to an embodiment of the present disclosure.
Figure 5:
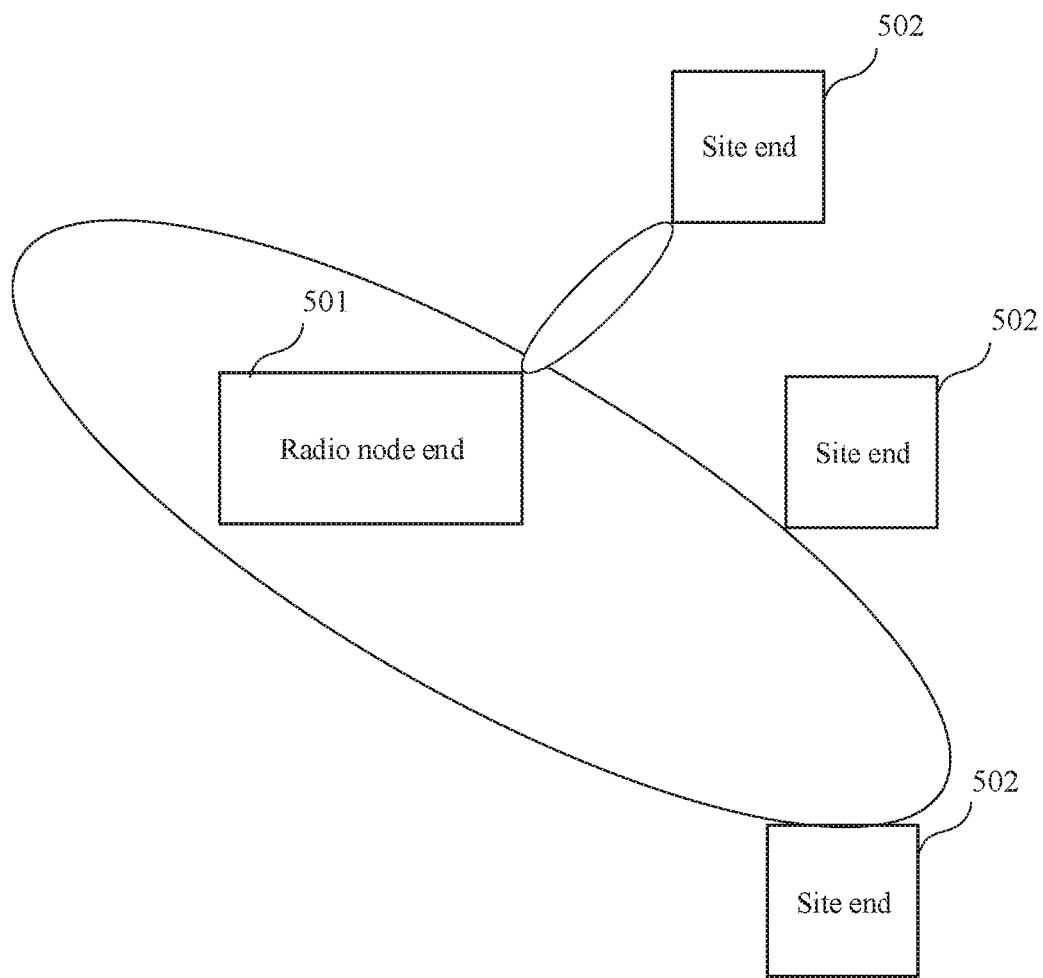
FIG. 5 is a structural schematic view of a combined antenna field shape according to another embodiment of the present disclosure.

Alternatively, in the calculating, by the radio node end, a directional antenna field shape adapted to the site end, a variety of antenna fields are stored in the radio node end, including a directional antenna field shape, an omnidirectional antenna field shape, and a combination of the both. Because the amount of the site ends connected with the radio node end may be larger than 1, an antenna field shape simultaneously adapted to different site ends is combined by the radio node end, from the directional antenna field shape, the omnidirectional antenna field shape, and the combination of the both. In such a way, the radio node end may be simultaneously communication connected with different site ends. It should be noted that the number of antenna field shapes stored in the radio node end is huge. For example, there are 50-5000 types of antenna fields stored in the radio node end, including directional antenna field shapes with different directions, different omnidirectional antenna field shapes, and the combined antenna field shapes of the directional antenna field shapes and the omnidirectional antenna field shapes. In each antenna field shape, the amount of the directional antenna field shapes, that of the omnidirectional antenna field shapes and that of the combined antenna field shapes may be any number. The combined antenna field shape may include a radio node end 401 radiating three directional antenna field shapes with different pointing directions to three different site ends 402, respectively, as shown in FIG. 4. Alternatively, the combined antenna field shape may include a radio node end 501 radiating a directional antenna field shape and an omnidirectional antenna field shape to three different site ends 502, as shown in FIG. 5, which are not limited here. At the time of shipment of the radio node end, the antenna field shape is pre-configured according to the applicable environment and stored in the radio node end. A directional antenna field shape adapted to the connected site end is searched in the stored antenna field shapes by the radio node end, such that the radio node end may obtain the relative position of the site end to the radio node end.

The omnidirectional antenna field shape is an antenna field shape that exhibits 360° uniform radiation in a plane, that is, the omnidirectional antenna field shape is non-directional. In a plane perpendicular to the radiation plane, the omnidirectional antenna field shape exhibits a beam with a certain width. Normally, the smaller a width of a wave petal is, the greater a gain of the beam is. In a mobile communication system, the omnidirectional antenna field shape is generally applicable in a station type of suburban-county regional system. A coverage of the omnidirectional antenna field shape is large. In the radiation plane of the omnidirectional antenna field shape radiated from the radio node end, the communication connection between the radio node end and the site end may be established in all directions. Since the omnidirectional antenna field shape is non-directional, after the establishment of the communication connection, the radio node end and the site end may still not sense the relative position of each other.

The directional antenna field shape exhibits a certain range of angular radiation in a radiation plane, that is, the directional antenna field shape is directional. Same as the omnidirectional antenna field shape, the smaller the width of the wave petal of the directional antenna field shape is, the greater the gain is. In a mobile communication system, the directional antenna field shape is generally applicable in environments with far communication distance, small coverage, high target density, and high utilization rate of frequency. Since the directional antenna field shape is directional, after the establishment of the communication connection, the radio node end may sense the relative position of the site end relative to the radio node end.

At block S302: Whether a test cycle period for a transmission performance between the radio node and the site end has been reached is determined.

In the embodiment, if the test cycle period for the transmission performance between the radio node end and the site end has been reached, block S306 is performed. If the test cycle period has been not reached, block S303 is continued.

In the embodiment, the transmission performance between the radio node end and the site end is periodically detected, with a second preset duration as the test cycle period. A calculation and a determination of the optimal antenna field shape between the radio node end and the site end is a computationally intensive procedure, and may be implemented by a central processing unit (CPU). The higher a frequency of the calculation and determination process is, the more closely the adjustment of the antenna field shape between the radio node end and the site end is adapted to an actual motion state of the site end, and thus the better the transmission performance between the radio node end and the site end is ensured. However, a CPU computational load is also heavier, resulting in excessive power consumption. Therefore, in the embodiment, a periodic detection of the transmission performance between the radio node end and the site end is performed to reduce the CPU computational load, and reduce a power consumption of the radio node end.

Alternatively, the second preset duration may be 2 minutes, 3 minutes, 4 minutes, 5 minutes, etc. The transmission performance between adjacent radio node end and the site end is detected with a time interval of the second preset duration, to reduce the computational load on the CPU of the radio node end and reduce the power consumption of the radio node end. The second preset duration is artificially pre-configured, and may be configured according to a complexity of the environment at the radio node end and the site end, and according to needs of a user. For example, the more complex the environment at the radio node end and the site end is, and the more interference factors of the environment, the shorter the test cycle period is required to be. Alternatively, if the user needs to control the detection cycle to a certain length of time, the second preset duration is set to that length of time, and is not limited here.

At block S303: An antenna field shape information between the radio node end and the site end is obtained.

In the embodiment, the antenna field shape between the radio node end and the site end can also be adjusted when the time is not in the test cycle period for the transmission performance between the radio node end and the site end, such that the transmission condition between the radio node end and the site end may be monitored in real time. Therefore, according to the embodiment, the motion state of the site end is monitored, such that the antenna field shape between the radio node end and the site end may be adjusted and optimized in real time. The antenna field shape information between the radio node end and the site end is required to be obtained. When the antenna field shape between the radio node end and the site end does not satisfy the requirements for transmitting and communicating radio signals between the radio node end and the site end, the antenna field shape therebetween is required to be adjusted.

Alternatively, the antenna field shape information between the radio node end and the site end may include a direction of the antenna field shape of the radio signal propagated from the radio node end to the site end, and the transmission performance between the radio node end and the site end.

At block S304: An image information of the site end is obtained based on the antenna field shape information between the radio node end and the site end, to monitor a motion state of the site end.

In the embodiment, after the antenna field shape information between the radio node end and the site end is obtained, the pointing direction of the antenna field shape of the radio signal propagated from the radio node end to the site end and the transmission performance between the radio node end and the site end are obtained. Based on the pointing direction of the antenna field shape of the radio signal propagated from the radio node end to the site end, a relative direction of the site end to the radio node end may be obtained. Based on the level of transmission performance between the radio node end and the site end, a distance between the radio node end and the site end may be obtained. Based on the relative direction and distance between the radio node end and the site end, a relative position of the site end with respect to the radio node end may be determined. An image screen may be captured by the radio node through a camera unit thereon within a monitoring range of the radio node. Since the relative position of the site end with respect to the radio node end is obtained, the radio node end may determine the image information of the position of the site end in the captured image screen. The captured image information of the position of the end of the site is identified as the image information of the site end, to monitor the motion state of the site end. If a motion occurs in the image information corresponding to the site end in the image screen captured by the radio node end, the site end is determined to be displaced. Based on the above, the motion state of the site end is monitored.

Alternatively, since the motion state of the site end may not only include a linear displacement, rather also include a rotational motion around the site end itself. The site end may also be obscured by other obstacles. All these factors may affect the radio node end to monitor the motion state of the site end. Therefore, the radio node may self-adaptive learn the different motion states of the site end, and process all the images of the same site end in different motion states as the image information of the site end. Specifically, the image information of each part of the site end is obtained; the image information of each part of the site end in each rotational state is obtained; and the image information of the different parts of the site end obscured by other obstacles is obtained, to monitor the motion state of the site end. For example, the site end is a smartphone including a top, a bottom, a front side, and a back side, etc. The radio node end records images of each part of the site end, images of each part of the site end under different rotational states, and images of the different parts of the site end obscured by other obstacles (e.g. 20% of the smartphone is obscured by obstacles, the image information of unobscured 80% of the smartphone is identified as the smartphone) are identified as images of the site end. By means of the above, one of the sides of the site end is presented to the radio node end, or the side presented to the radio node end keeps changing due to the rotational motion on the site end itself, or the site end is partially obscured by obstacles so that only part of the site end is presented to the radio node end. A combination of the above cases is also possible. The radio node end may identify the images of each part of the site end, the images of each part of the site end under different rotational states, and the images of the different parts of the site end obscured by other obstacles as the site end, with the ability of self-adaptive learning.

It should not be excluded that the site end (e.g., a portable electronic device such as a mobile terminal) may be placed by the user in a pocket, or a backpack, etc. When the appearance (e.g., shape, color, etc.) of household goods placed close to the site end is consistent with that of the site end, the identification of different site ends by the radio node end may be affected. Based on the above, the radio node end obtains an associated image information corresponding to the site end as the image information of the site end, to monitor the motion state of the site end. The associated image information is the image information of a carrier carrying the site end. The associated image information may be a face image of the user of the site end. When the site end is placed by the user in the pocket or the backpack, the radio node end cannot obtain the image of the site end directly. The motion state of the face image of the user may be monitored by acquiring the user's face image, such that the motion state of the site end is monitored due to the uniqueness of human facial features. When the user carries multiple site ends, the relative distance between the multiple site ends is small, and the antenna field shape of the radio signals propagated from the radio node end is of a range sufficient to cover the multiple site ends. Therefore, the antenna field shape of the user directed to the multiple site ends may be selected. To ensure adequate transmission performance between the radio node end and the site end, multiple antenna field shapes directed to the user may be selected, which is not limited here.

S305: Whether the site end is displaced is determined.

In the embodiment, if the site end is displaced, block S306 is performed. If the site end is not displaced, block S305 is continued.

In the embodiment, if a displacement occurs in the image information of the site end, the site end is displaced, which means that there is a misalignment of the coverage of the antenna field shape of the radio signal radiated to the site end by the radio node end. In such a way, the antenna field shape of the radio signal radiated by the radio node end may not cover the site end, affecting the radio signal transmission between the radio node end and the site end. Therefore, when the site end is displaced, a second determination is required to detect the transmission performance between the radio node end and the site end. If the displacement of the site end affects the transmission performance between the radio node end and the site end, and is not adequate for the normal signal transmission, the antenna field shape between the radio node end and the site end is required to be adjusted. If the displacement of the site end does not affect the transmission performance therebetween, or if the antenna field shape between the position-changed site end and the radio node end is still adequate for normal signal transmission, the antenna field shape between the radio node end and the site end is not required to be adjusted.

Alternatively, a frame screen of the image screen captured by the radio node end is obtained with a first preset duration as a cycle period. The positions of the image information corresponding to the site end in the frame screens of adjacent cycle periods are determined whether to be displaced in the image screen captured by the radio node end. If the positions of the image information corresponding to the site end in the frame screens of adjacent cycle periods are displaced, the site end is determined to have been displaced, and vice versa.

The first preset duration may be at a level of measurement units of microsecond or millisecond, such as 1 millisecond, 2 milliseconds and 3 milliseconds. The first preset duration may include, but is not limited to, the above-mentioned value. The first preset duration determines the real time determination of the position change of the site end by the radio node end. The smaller the value of the first preset duration is, the shorter the period of acquisition of the frame screens is, and the more accurately the position change of the image information of the site end in the frames of the adjacent cycles reflects the displacement of the site end at different times, and the more accurately the position change of the image information of the site end in each obtained frame corresponds to the actual displacement of the site end.

If a similarity of image regions in the frame screens of adjacent cycle periods is equal to or higher than a certain similarity ratio, then the image regions are identified as the same region, such that the image information of the same site end is searched in the frame screens of adjacent cycle periods. If the position of the image information of the site end in the frame screens of adjacent cycle periods changes, then the site end is displaced. The above-mentioned similarity ratio is configured based on a clarity of the picture captured by the radio node end and a recognition ability of the radio node end. The similarity ratio may be 80%, 90%, 95% and etc. when the clarity of the picture captured by the radio node end and then recognition ability of the same is higher, the similarity ratio may be increased appropriately, to improve the accuracy of the radio node end to determine the image information of the site-end.

The first preset duration determines the self-adaptive learning of the image information of the site end by the radio node end. Assuming that the first preset duration is short enough, the moments of the adjacent frame screens are close to each other. Whether the site end is performing a linear motion or a rotation, in a sufficiently short time interval, the image information of the site end changes in a sufficiently small magnitude. That is, the similarity of the image information of the site end in the frame screens of adjacent cycle periods reaches the similarity ratio. The image information of the frame screens is then identified as the image information of the same site end. Whether the site end is performing a linear motion, or rotating around a point/axis, or obstructed by an obstacle, as long as the first preset duration is short enough, (i.e., the cycle periods of frame acquisition by the radio node end is short enough), the change magnitude in the image screes of the site end is small enough. The radio node end also records and stores the changed image screens of the site end, and identifies them as the image information of the site end as well, which is the self-adaptive learning process of the radio node end. The value of the first preset duration determines the accuracy of the radio node end to determine the images of the site end.

For example, if the value of the first preset duration is configured too large, the images of the site end in the frame screens of adjacent cycle periods may change in a too large magnitude. The radio node end then does not identify the images of the site end in the frame screens of adjacent cycle periods as the images of the same site end. While the images of the site end in the frame screens of adjacent cycle periods are supposed to be the images of the same site end in fact, but with the change magnitude exceeding the similarity ratio on which the determining of the radio node end is based.

At block S306: Whether the transmission performance between the radio node end and the site end reaches a preset performance target is determined.

In the embodiment, if the transmission performance between the radio node end and the site end does not reach the preset performance target, block S307 is performed. If the transmission performance between the radio node end and the site end reaches the preset performance target, block S305 is continued.

In the embodiment, if the site end is displaced, the transmission performance between the displaced site end and the radio node end is required to be detected, to determine whether the displacement of the site end affects the transmission performance between the radio node end and the site end, and whether a normal transmission of radio signals between the node end and the site end is ensured.

Alternatively, the transmission performance between the radio node end and the site end may include a strength and a network packet drop rate of the radio signal between the radio node end and the site end. The network packet drop rate is a ratio of the number of packets lost to the number of packets sent. Specifically, the antenna field shape of the radio signal radiated from the radio node end nearly does not cover the site end, when the strength of the radio signal between the radio node end and the site end is lower than a preset signal strength (i.e., lower than a strength previously required for a normal radio transmission between the two. Strength), for example, when Received Signal Strength Indication (RSSI) between the radio node end and the site end is an undesirable low value such as −80 dB; or when the network packet drop rate between the radio node end and the site end is higher than a preset packet drop rate, for example, the network packet drop rate is higher than 10%. The preset signal strength and the preset packet drop rate are both required to ensure the normal radio signal transmission between the radio node end and the site end, which is not limited here. The transmission performance between the radio node end and the site end does not meet the preset performance target is determined, when the strength of the radio signal between the radio node end and the site end is lower than the preset signal strength or when the network packet drop rate is higher than the preset packet drop rate. When the strength of the radio signal between the radio node end and the site end is lower than the preset signal strength and the network packet drop rate is higher than the preset packet drop rate, that is, when the two conditions are both satisfied, the transmission performance between the radio node end and the site end does not meet the preset performance target is determined, which is not limited here.

At block S307: The antenna field shape between the radio node end and the site end is adjusted.

In the embodiment, if the transmission performance between the radio node end and the site end does not reach the preset performance target, then the antenna field shape between the radio node end and the site end is required to be adjusted. The radio node end selects the antenna field shape adapted to the displaced site end along the displacement direction of the site end, from a large number of antenna field shapes stored in the radio node end. For example, if the site end is displaced in a certain distance to the right of the radio node end, then the radio node end selects an antenna field shape from antenna field shapes stored in the radio node end, and adapt the antenna field shape to the displaced site end. The direction of the antenna field shape is right to the direction of the original antenna field shape radiated from the radio node end to the before-displaced site end. In such a way, the transmission performance between the radio node end and the displaced site end may reach the preset performance target.

It should be noted that the radio node end may establish a communication connection with multiple site ends at the same time. In the process of adjusting, by the radio node end, the antenna field shape between the radio node and the multiple site ends, a perfect directional antenna field shape and combinations thereof adapted to all site ends may not be found. Therefore, the radio node end radiates an omnidirectional antenna field shape to a part of the site ends that are not perfectly aligned, to establish a communication connection, as shown in FIG. 5.

In summary, the present disclosure establishes a communication connection between the radio node end and the site end, obtaining the antenna field shape information between the radio node end and the site end. Based on the obtained antenna field shape information, the relative position of the site end and the radio node end is determined, to identify the image of the corresponding position in the image screen captured by the node end as the image information of the site end. The self-adaptive learning is performed by the radio node end, such that the image of the site end in different motion states is omnidirectional captured as the image information of the site end. The motion state of the site end is monitored based on the image information. If the site end is displaced, a second determination is performed, that is, the transmission performance between the radio node end and the site end is detected, to adjust the antenna field shape between the radio node end and the site end, avoiding meaningless adjustments. The motion state of the site end is monitored in real time to adjust the antenna field shape between the radio node end and the site end in real time.

Figure 6:
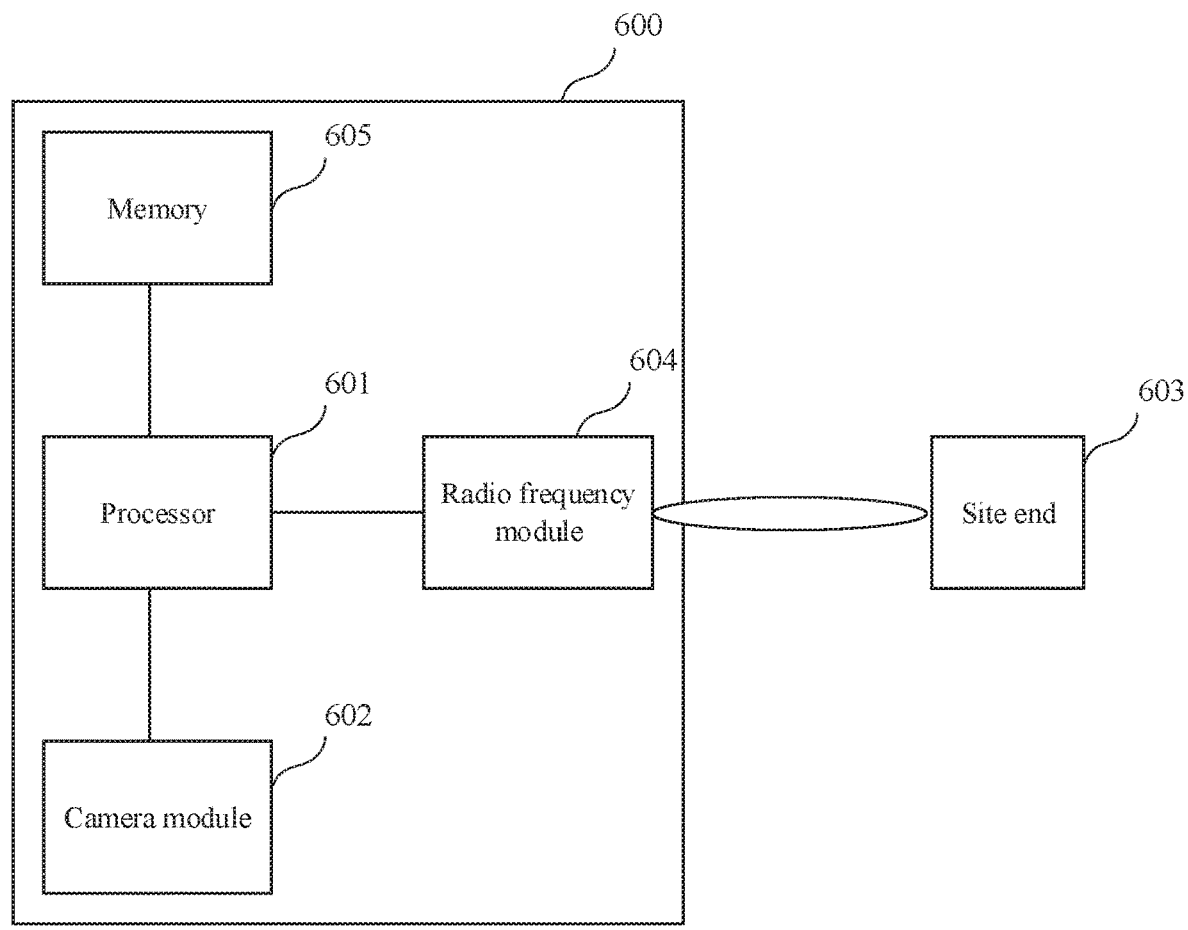
FIG. 6 is a structural schematic view of a radio device according to an embodiment of the present disclosure.

Referring to FIG. 6, FIG. 6 is a structural schematic view of a radio device according to an embodiment of the present disclosure.

In the embodiment, the radio device 600 may include a processor 601 and a camera module 602. The processor 601 is coupled to the camera module 602. The processor 601 is configured to control the radio device 600 to establish a communication connection with a site end 603. The processor 601 is configured to obtain an antenna field shape information between the radio device 600 and the site end 603. The processor 601 is to control the camera module 602 to obtain an image information of the site end 603 based on the antenna field shape information between the radio device 600 and the site end 603. In such a way, the motion state of the site end 603 is monitored, and whether the site end 603 is displaced is determined. If the site end 603 is displaced, the antenna field shape between the radio device 600 and the site end 603 is adjusted.

The camera module 602 may be a wide-angle camera or other camera equipment, with a viewing angle of 180 degrees and etc. The camera module 602 is inexpensive. A quality of the image screen required for monitoring the motion state of the site end 603 is low. Therefore, the camera module 602 meets the requirement for monitoring the motion state of the site end 603 to which the radio equipment 600 is connected. When in use, the camera module 602 is fixed on the radio device 600. The field of view monitored by the camera module 602 is also fixed. The camera module 602 monitors the motion state of the site end 603 within the field of view.

The radio device 600 also includes a radio frequency module 604. The radio device 600 radiates radio signals to an external environment via the radio frequency module 604, to establish the communication connection with each site end 603. The radio equipment 600 includes a memory 605. The memory 605 stores all antenna field shapes stored in the device 600. The radio device 600 selects the antenna field shape adapted to the site end 603 currently connected with the radio device 600 from the antenna field shapes stored in the memory 605.

Figure 7:
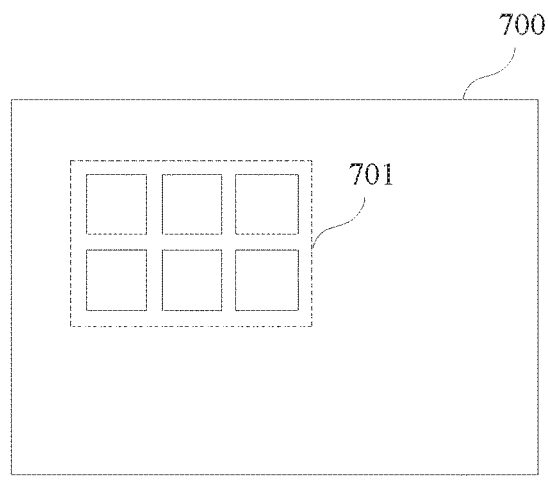
FIG. 7 is a structural schematic view of a device having a storage function according to an embodiment of the present disclosure.

Referring to FIG. 7, FIG. 7 is a structural schematic view of a device having a storage function according to an embodiment of the present disclosure.

In the embodiment, a device 700 having the storage function stores a program data 701. The program data 701 is capable of being executed to implement the method for controlling the wireless communication described in the above embodiments, which will not be repeated herein.

It should be understood, that the system, device and method disclosed in several embodiments provided by the present disclosure may be implemented in other ways. The above-described implementations of the device are schematic. For example, the division of the module or unit is a logical function division, which can be implemented in a different way (e.g. multiple units or components may be combined or integrated into another system, or some features may be ignored, or not performed). The illustrated or discussed coupling (direct coupling or communication connections) among each other may be through the indirect coupling or the communication connection of some interfaces, devices, or units. The coupling may be electrical, mechanical or of other forms.

Units illustrated as separate components may or may not be physically separate. Components illustrated as units may or may not be physical units, i.e. may be located in a place, or may also be distributed on a plurality of network units. Some or all of the units may be selected to achieve the purposes of the present embodiment according to actual needs.

In addition, each functional unit in the embodiments of the present disclosure may be integrated in a single processing unit, or may be individually a physical unit, respectively; or two or more units may be integrated in a single unit. The above integrated units may be implemented either in a form of hardware or in a form of software functional units.

When the integrated unit is implemented as a software functional unit and sold or used as a standalone product, the integrated unit may be stored in a computer-readable storage medium. The technical scheme of the present disclosure essentially, or part of the technical scheme that contributes to the prior art, or all or part of the technical scheme, may be embodied in the form of a software product. The computer software product may be stored in a device having a storage function. The computer software product may include instructions to enable a computer device (e.g., a personal computer, a server, or a network device, etc.) or a processor to perform all or some of the operations of the method described in the embodiment according to the present disclosure. The device having a storage function may include: a USB flash drive, a removable hard drive, a read-only memory (ROM), a random access memory (RAM), a diskette, a CD-ROM, a server or other media capable of storing program codes.

The above description is for the purpose of illustrating implementations of the present disclosure, but not to limit the scope of the present disclosure. Any equivalent structural or process transformation performed based on the drawings and the specification of the present disclosure, applied directly and indirectly in other related art, should be within the scope of the present disclosure.

What is claimed is:

1. A method for controlling a wireless communication, comprising:
    establishing a communication connection between a radio node end and a site end, and obtaining an antenna field shape information between the radio node end and the site end;
    obtaining an image information of the site end based on the antenna field shape information between the radio node end and the site end to monitor a motion state of the site end; and
    determining whether the site end is displaced, and adjusting the antenna field shape between the radio node end and the site end in response to the site end being determined to be displaced.

2. The method according to claim 1, wherein the establishing the communication connection between the radio node end and the site end comprises:
    propagating, by the radio node end, a radio signal with an omnidirectional antenna field shape, and propagating, by the site end, a radio signal with the omnidirectional antenna field shape, to establish the communication connection between the radio node end and the site end; and
    an operation after the establishing the communication connection between the radio node end and the site end, comprising: adjusting the antenna field shape of the radio signal propagated from the radio node end from the omnidirectional antenna field shape to a directional antenna field shape adapted to the site end.

3. The method according to claim 1, wherein the antenna field shape information between the radio node end and the site end comprises: a pointing direction of the antenna field shape between the radio node end and the site end, and a transmission performance between the radio node end and the site end.

4. The method according to claim 3, wherein the transmission performance between the radio node end and the site end comprises: a strength of the radio signal between the radio node end and the site end, and a network packet drop rate of the radio signal between the radio node end and the site end.

5. The method according to claim 3, wherein the obtaining the antenna field shape information between the radio node end and the site end comprises:
    obtaining a relative direction between the radio node end and the site end based on the pointing direction of the antenna field shape of the radio signal propagated from the radio node end to the site end;
    obtaining a distance between the radio node end and the site end based on the transmission performance between the radio node end and the site end;
    determining a position of the site end and obtaining the image information of the position of the site end as the image information of the site end, based on the relative direction and the distance between the radio node end and the site end, to monitor the motion state of the site end.

6. The method according to claim 5, wherein the radio node self-adaptive learns the different motion states of the site end, and process the image information of the site end in different motion states as the image information of the same site end.

7. The method according to claim 6, comprising:
obtaining the image information of each part of the site end, the image information is identified as the image information of the site end to monitor the motion state of the site end.

8. The method according to claim 7, wherein the obtaining the image information of each part of the site end comprises: obtaining the image information of each part of the site end in different rotational states, and obtaining the image information of parts of the site end obscured by an obstacle.

9. The method according to claim 5, comprising:
obtaining an associated image information corresponding to the site end as the image information of the site end to monitor the motion state of the site end, wherein the associated image information is the image information of a carrier carrying the site end.

10. The method according to claim 1, wherein the determining whether the site end is displaced comprises:
obtaining a frame screens with a first preset duration as a cycle, and determining whether the position of the image information of the site end in the frame screens of adjacent cycle periods changes, wherein in response to the position of the image information of the site end in the frames of adjacent cycle periods changing, the site end is determined to be displaced.

11. The method according to claim 10, wherein the adjusting the antenna field shape between the radio node end and the site end comprises:
in response to the site end being determined to be displaced, determining whether the transmission performance between the radio node end and the site end reaches a preset performance target; and
in response to the site end being determined not to be displaced, selecting, by the radio node end, the antenna field shape adapted to the displaced site end along a displacement direction of the site end.

12. The method according to claim 1, wherein an operation after the establishing the communication connection between the radio node end and the site end, comprising:
detecting periodically whether the transmission performance between the radio node end and the site end reaches a preset performance target, with a second preset duration as a test cycle period;
in response to the transmission performance between the radio node end and the site end not reaching the preset performance target, or a clock-time being not in the test cycle period,
obtaining the antenna field shape information between the radio node end and the site end; obtaining the image information of the site end based on the antenna field shape information between the radio node end and the site end to monitor a motion state of the site end; determining whether the site end is displaced; and adjusting the antenna field shape between the radio node end and the site end in response to the site end being determined to be displaced.

13. A device having a storage function, capable of storing a program data, wherein the program data is executed to achieve method for controlling a wireless communication, comprising:
establishing a communication connection between a radio node end and a site end, and obtaining an antenna field shape information between the radio node end and the site end;
obtaining an image information of the site end based on the antenna field shape information between the radio node end and the site end to monitor a motion state of the site end; and
determining whether the site end is displaced, and adjusting the antenna field shape between the radio node end and the site end in response to the site end being determined to be displaced.

14. The device according to claim 13, wherein the establishing the communication connection between the radio node end and the site end comprises:
propagating, by the radio node end, a radio signal with an omnidirectional antenna field shape, and propagating, by the site end, a radio signal with the omnidirectional antenna field shape, to establish the communication connection between the radio node end and the site end; and
an operation after the establishing the communication connection between the radio node end and the site end, comprising: adjusting the antenna field shape of the radio signal propagated from the radio node end from the omnidirectional antenna field shape to a directional antenna field shape adapted to the site end.

15. The device according to claim 13, wherein the antenna field shape information between the radio node end and the site end comprises: a pointing direction of the antenna field shape between the radio node end and the site end, and a transmission performance between the radio node end and the site end.

16. The device according to claim 15, wherein the transmission performance between the radio node end and the site end comprises: a strength of the radio signal between the radio node end and the site end, and a network packet drop rate of the radio signal between the radio node end and the site end.

17. A radio device, comprising a processor, a camera module, a device having a storage function, and a radio frequency module, wherein the processor is coupled to the camera module, operations performed by the processor comprise:
controlling a communication connection between a radio node end and a site end to be established, obtaining the antenna field shape information between the radio node end and the site end;
controlling the camera module to obtain an image information of the site end based on the antenna field shape information between the radio node end and the site end, to monitor a motion state of the site end;
determining whether the site end is displaced, and adjusting the antenna field shape between the radio node end and the site end in response to the site end being determined to be displaced.

18. The radio device according to claim 17, wherein the camera module is fixed on the radio device 600; a field of view monitored by the camera module is also fixed; the camera module monitors the motion state of the site end within the field of view.

19. The radio device according to claim 17, wherein the establishing the communication connection between the radio node end and the site end comprises:
propagating, by the radio node end, a radio signal with an omnidirectional antenna field shape, and propagating, by the site end, a radio signal with the omnidirectional antenna field shape, to establish the communication connection between the radio node end and the site end; and an operation after the establishing the communication connection between the radio node end and the site end, comprising: adjusting the antenna field shape of the radio signal propagated from the radio node end from the omnidirectional antenna field shape to a directional antenna field shape adapted to the site end.

20. The radio device according to claim 17, wherein the antenna field shape information between the radio node end and the site end comprises: a pointing direction of the antenna field shape between the radio node end and the site end, and a transmission performance between the radio node end and the site end;

the obtaining the antenna field shape information between the radio node end and the site end comprises:

obtaining a relative direction between the radio node end and the site end based on the pointing direction of the antenna field shape of the radio signal propagated from the radio node end to the site end;

obtaining a distance between the radio node end and the site end based on the transmission performance between the radio node end and the site end;

determining a position of the site end and obtaining the image information of the position of the site end as the image information of the site end, based on the relative direction and the distance between the radio node end and the site end, to monitor the motion state of the site end.

\* \* \* \* \*